United States Patent [19]

Lipscomb et al.

[11] Patent Number: 4,879,318

[45] Date of Patent: Nov. 7, 1989

[54] PLASTIC LENS COMPOSITION AND METHOD FOR THE PRODUCTION THEREOF

[75] Inventors: N. Thornton Lipscomb; Omar M. Buazza, both of Louisville, Ky.

[73] Assignee: Ophthalmic Research Group International, Inc., Louisville, Ky.

[21] Appl. No.: 273,428

[22] Filed: Nov. 18, 1988

Related U.S. Application Data

[63] Continuation-in-part of Ser. No. 21,913, Mar. 4, 1987, abandoned, which is a continuation-in-part of Ser. No. 823,339, Jan. 28, 1986, Pat. No. 4,728,469.

[51] Int. Cl.$^4$ .................. C08F 2/50; C08F 18/24; C08F 220/28; C08F 220/20
[52] U.S. Cl. .................. 522/42; 425/174.4; 522/8; 522/76; 522/78; 522/79; 522/168; 522/181; 526/270; 526/314
[58] Field of Search ............ 526/314; 522/42, 181

[56] References Cited

U.S. PATENT DOCUMENTS

| | | | |
|---|---|---|---|
| 2,524,862 | 10/1950 | White | 264/1.4 |
| 2,525,664 | 10/1950 | Gadsby et al. | 264/22 |
| 3,038,210 | 6/1962 | Hungerford et al. | 264/2.2 |
| 3,210,297 | 10/1965 | Fischer et al. | 522/168 |
| 3,222,432 | 12/1965 | Grandperret | 264/2.5 |
| 3,364,525 | 1/1968 | Davy et al. | 264/1.2 |
| 3,503,942 | 3/1970 | Seiderman | 526/314 |
| 3,551,235 | 12/1970 | Bassemir et al. | 522/181 |
| 3,605,195 | 9/1971 | Campbell | 264/2.2 |
| 4,126,527 | 11/1978 | Kaufman | 522/168 |
| 4,138,538 | 2/1979 | Kaetsu et al. | 522/181 |
| 4,146,696 | 3/1979 | Bond et al. | 526/314 |
| 4,166,088 | 8/1979 | Neefe | 264/1.4 |
| 4,197,266 | 4/1980 | Clark et al. | 264/2.2 |
| 4,298,005 | 11/1981 | Mutzhas | 128/396 |
| 4,308,400 | 12/1981 | Felder et al. | 522/44 |
| 4,382,902 | 5/1983 | Feurer | 264/1.4 |
| 4,512,340 | 4/1985 | Buck | 522/96 |
| 4,528,351 | 7/1985 | Tarumi | 526/314 |
| 4,542,201 | 9/1985 | Kanemura | 526/314 |
| 4,561,951 | 12/1985 | Neckers | 522/33 |
| 4,594,288 | 6/1986 | Dobigny et al. | 522/181 |
| 4,622,376 | 11/1986 | Misura | 526/314 |
| 4,666,976 | 5/1987 | Misura | 526/314 |
| 4,728,469 | 3/1988 | Danner et al. | 264/1.4 |
| 4,742,133 | 5/1988 | Tang | 526/314 |

FOREIGN PATENT DOCUMENTS

| | | | |
|---|---|---|---|
| 3917442 | 8/1964 | Japan | 522/178 |
| 132221 | 10/1980 | Japan | 264/1.4 |
| 59-86603 | 5/1984 | Japan | . |
| 60-245607 | 12/1985 | Japan | 522/178 |

Primary Examiner—Lewis T. Jacobs
Assistant Examiner—A. H. Koeckert
Attorney, Agent, or Firm—Haynes and Boone

[57] ABSTRACT

A method for making a plastic lens and a plastic lens made thereby. The method comprises disposing a liquid monomer or a monomer mixture and a photosensitive initiator into a mold cavity and directing ultraviolet light to act on the lens forming material in the cavity to produce a lens therefrom. The liquid monomer mixture may include one or more of diethylene glycol bis(allyl)-carbonate, bisphenol A diallyl carbonate, 1,6 hexanedioldimethacrylate, trimethylol propane triacrylate, tetraethylene glycol diacrylate, tripropylene glycol diacrylate, tetrahydrofurfurylmethacrylate, tetrahydrofurfuryl acrylate and styrene. The photosensitive initiator may be selected from the group of 2-hydroxy-2-methyl-1-phenyl-propan-1-one and 1-hydroxycyclohexyl phenyl ketone.

3 Claims, 4 Drawing Sheets

PLASTIC LENS COMPOSITION AND METHOD FOR THE PRODUCTION THEREOF

CROSS-REFERENCE TO RELATED PATENT APPLICATIONS

This application is a continuation-in-part of application Ser. No. 021,913, filed Mar. 4, 1987, now abandoned, which is a continuation-in-part of application Ser. No. 823,339, filed Jan. 28, 1986, now U.S. Pat. No. 4,728,469.

BACKGROUND OF THE INVENTION

This invention relates generally to plastic lens compositions and methods and apparatus for making plastic lenses, and in one of its aspects to corrective or plano plastic lenses for use in eyeglasses and the like.

Optical lenses have been produced from the polymer of diethylene glycol bis(allyl)-carbonate (DEG-BAC) by thermal curing techniques. These techniques for polymerizing DEG-BAC to produce an optical lens, however, have several disadvantages and drawbacks. One of the most significant drawbacks is that it takes approximately 12 hours to produce a lens according to this technique and therefore a lens forming mold can produce at most two lenses per day.

Moreover, the thermal curing process employs a thermal catalyst so that the polymerizable mixture of DEG-BAC and catalyst will slowly polymerize even while refrigerated. The polymerizable mixture therefore has a very short shelf life and must be used within a short time or it will harden in its container.

Furthermore, the thermal catalysts utilized in these procedures are quite volatile and dangerous to work with requiring extreme care in handling.

U.S. Pat. No. 4,166,088 discloses the formation of a plastic lens by disposing a lens forming material comprising a liquid monomer and a photosensitive initiator into a mold cavity defined in part between a pair of spaced apart molds each having a lens forming surface facing the cavity and an outer opposed surface, and then directing rays of ultraviolet light against the outer surface of at least one of the molds to act on the lens forming material in the cavity to produce a lens therefrom.

U.S. Pat. Nos. 3,038,210 and 3,222,432 disclose the heating of a lens forming material in a mold cavity by an external heat source.

U.S. Pat. No. 4,298,005 discloses an apparatus for generating ultraviolet light having a wavelength in the range of 320 to 450 nm for hardening plastics.

The polymer of DEG-BAC exhibits desirable optical and mechanical properties. These include high light transmission, clarity, and index of refraction together with high abrasion and impact resistance. These properties in the past made DEG-BAC one of the leading monomers in the manufacture of high quality lenses, face shields, sun and safety glasses. Other properties of DEG-BAC, however, such as its slow rate of polymerization make it an undesirable monomer in the manufacture of these items.

SUMMARY OF THE INVENTION

One aspect of the present invention is to provide a method and apparatus for making a plastic lens, such as an optical lens for use in eyeglasses and the like.

In one embodiment of the present invention a lens forming material comprising a liquid monomer and a photosensitive initiator is disposed in a mold cavity defined in part between a pair of spaced apart molds each having a lens forming surface facing the cavity and an outer opposed surface. Rays of ultraviolet light are directed against the outer surface of at least one of the molds to act on the lens forming material disposed in the cavity to produce a lens. The rays of ultraviolet light are substantially evenly distributed throughout the lens forming material to prevent optical distortions in the finished lens. According to this embodiment, the liquid monomer of the lens forming material includes diethylene glycol bis(allyl)-carbonate and the photosensitive initiator of the lens forming material is selected from 2-hydroxy-2-methyl-1-phenyl-propan-1-one and 1-hydroxycyclohexyl phenyl ketone.

Another aspect of the present invention is to prevent ultraviolet light having a wavelength below approximately 300 nm from acting upon the lens forming material disposed in the mold cavity.

Accordingly, in another embodiment of the present invention apparatus is provided for making a plastic lens from a lens forming material that includes a liquid monomer and a photosensitive initiator. The apparatus includes a pair of spaced apart molds defining a mold cavity. Each mold has a lens forming surface facing the cavity and an outer opposed surface. The apparatus also includes an ultraviolet light source for directing rays of ultraviolet light against the outer surface of at least one of the molds to act on the lens forming material disposed in the cavity to produce a lens. The rays of ultraviolet light are substantially evenly distributed throughout the lens forming material to prevent optical distortions in the finished lens. In this embodiment, the apparatus also includes a device for preventing ultraviolet light having a wavelength below approximately 300 nm from acting upon the lens forming material.

Accordingly, it is an object of the present invention to provide a method and apparatus for making a plastic lens having one or more of the features as set forth above or hereinafter shown or described.

Another aspect of the present invention is to reduce the yellowing of the plastic lens during the making thereof.

In particular, yellowing of the plastic lens during the making thereof is reduced by the selection of components that are utilized to form the lens forming material.

According to another embodiment of the present invention, the lens forming composition includes diethylene glycol bis(allyl carbonate) (DEG-BAC) and one or more mono or multifunctional acrylate monomers that can be radiation cured to produce a hard, tough, clear, and strain-free polymeric material which has excellent optical qualities. Preferably, this composition includes a photoinitiator that may be selected from the group consisting of 2-hydroxy-2-methyl-1-phenyl-propan-1-one and 1-hydroxycyclohexyl phenyl ketone. Preferably, the mono or multifunctional acrylate monomers of this composition may be selected from tetrahydrofurfuryl acrylate (TFFA), trimethylol propane triacrylate (TMPTA) and tetrahydrofurfuryl-methacrylate (TFFMA).

Another object of the present invention is to provide a plastic lens made by the above-described method or apparatus.

It is a further object of the present invention to provide a plastic lens that can be produced in less than one hour.

It is a still further object of the present invention to provide a plastic lens that has no distortions, cracks, patterns, striations, defects, or aberrations.

It is a still further object of the present invention to provide a plastic lens that is clear and has negligible yellowing or other color that is detectable by the eye.

It is a still further object of the present invention to provide a plastic lens that is hard, strong and durable, and has very little flexibility at high temperatures.

It is a still further object of the present invention to provide a plastic lens that easily releases from the molding apparatus.

Toward the fulfillment of the above and other objects, according to a still further embodiment of the present invention, the lens forming composition includes a monomer mixture of bis phenol A diallyl carbonate, 1,6 hexanediol dimethacrylate (HDDMA), trimethylolpropane triacrylate (TMPTA), tetraethylene glycol diacrylate (TTEGDA), tripropylene glycol diacrylate (TRPGDA) and styrene. The composition includes 1-hydroxy cyclohexyl phenyl ketone as a photoinitiator and an effective amount of a mold release agent.

BRIEF DESCRIPTION OF THE DRAWINGS

The above brief description as well as further objects, features and advantages of the composition, method and apparatus of the present invention will be more fully appreciated by reference to the following detailed description of presently preferred but nonetheless illustrative embodiments in accordance with the present invention when taken in conjunction with the accompanying drawings in which.

DESCRIPTION OF THE PREFERRED EMBODIMENTS

Figure 1:
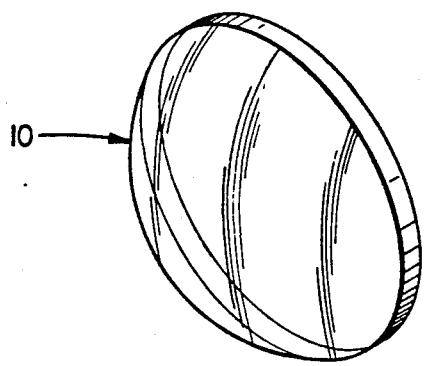
FIG. 1 is a perspective view of a plastic lens of the present invention.

While various aspects of the present invention are hereinafter illustrated and described as being particularly adapted for the production of a plastic lens for use in eyeglasses, it is to be understood that lenses for other uses can also be produced, such as safety glasses and UV-filters as well as lenses having high quality optical use for instrument sightings, photography and light filtration.

Therefore, the present invention is not to be limited to only the embodiments illustrated in the drawings, because the drawings are merely utilized to illustrate one of the wide variety of uses of this invention.

Referring now to FIG. 1, a plastic lens of the present invention is generally indicated by the reference numeral 10. The plastic lens 10 may be formed by an apparatus of the present invention that is generally indicated by the reference numeral 11 in FIGS. 2 and 3 and which will be hereinafter described. The plastic lens 10 is particularly adapted to be utilized in eyeglasses as it is approximately 5 percent harder and thereby more scratch resistant than plastic lenses formed by thermal curing techniques, such as in the manner set forth in U.S. Pat. Nos. 3,038,210 and 3,222,432, the disclosures of which are hereby specifically incorporated herein by reference. The plastic lens of the present invention is also more chemically inert than thermally cured lenses.

In addition, the plastic lens 10 of the present invention can be formed in a substantially shorter time period than thermally cured plastic lenses. Approximately 8 to 14 hours are required to form a thermally cured plastic lens whereas a plastic lens can be formed in less than 2 hours according to one embodiment of the method and apparatus 11 of the present invention.

According to one embodiment of the present invention the lens 10 has fewer optical distortions, if any, when the rays of ultraviolet light are substantially evenly distributed throughout the lens forming material from which the lens 10 is being formed. This feature is provided by the apparatus 11 and the method of the present invention described below.

Figure 2:
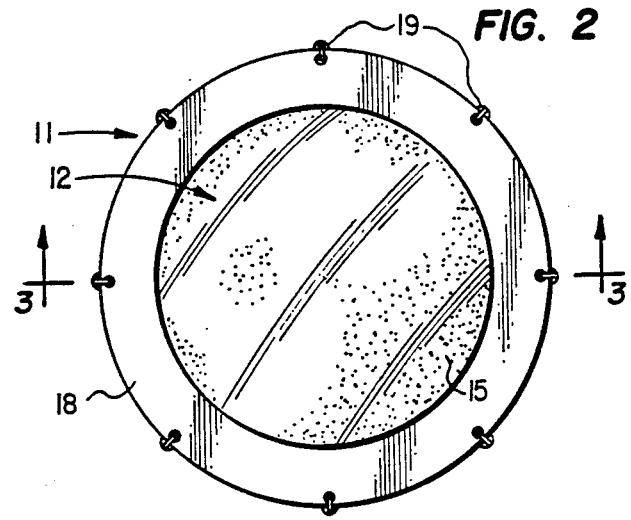
FIG. 2 is a reduced top view of a portion of an apparatus of the present invention that is illustrated in FIG. 3, FIG. 2 being taken substantially on line 2—2 of FIG. 3.
Figure 3:
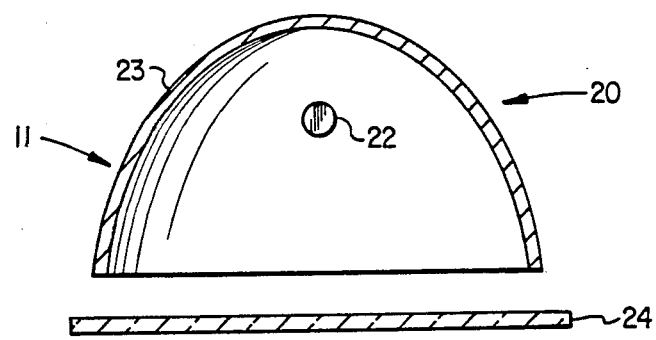
FIG. 3 is an enlarged fragmentary cross-sectional view taken on line 3—3 of FIG. 2 which schematically illustrates an apparatus for producing a plastic lens according to the present invention.
Figure 3:
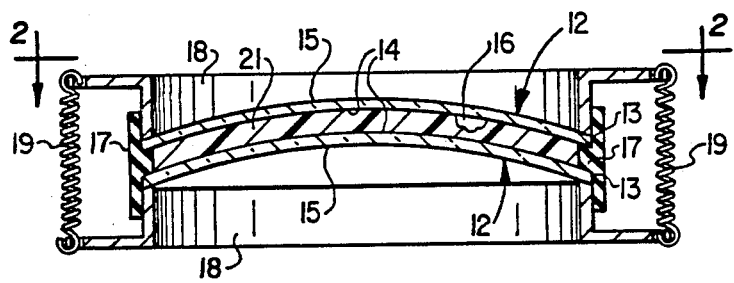
Figure 3:
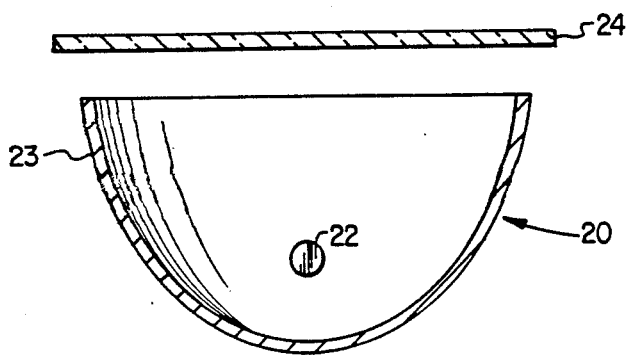

As illustrated in FIGS. 2 and 3, the apparatus 11 of the present invention includes a pair of suitably shaped mold members 12 formed of any suitable material that will permit rays of ultraviolet light to pass therethrough. The mold members 12, preferably, are formed of glass. Each mold member 12 has an outer peripheral surface 13 and a pair of opposed surfaces 14 and 15 with the surfaces 14 being precision ground. In a preferred embodiment the surfaces 15 are frosted to aid in the substantially even distribution of ultraviolet light. Preferably the molds have desirable ultraviolet light transmission characteristics and the mold surfaces preferably have no surface scratches or other defects.

In addition, the surfaces 14 and 15 of each mold member 12 can have substantially the same configuration so that the thickness of the mold member 12 is substantially uniform throughout for a purpose hereinafter set forth.

The mold members 12 are adapted to be held in spaced apart relation to define a mold cavity 16 between the facing surfaces 14 thereof. The mold members 12 are held in a spaced apart relation by a T-shaped flexible annular gasket 17 that seals the cavity 16 from the exterior of the mold members 12. The mold members 12 are held in assembled relation with the sealing gasket 17 by a pair of annular clamping members 18 that are held together preferably with a suitable spring force, such as a spring force that is provided by the tension springs 19 illustrated in the drawings.

In this manner, in the embodiment of the present invention that is illustrated in FIG. 3 the upper mold member 12 has a concave inner surface 14 while the lower mold member 12 has a convex inner surface 14 so that the resulting mold cavity 16 is shaped to form a lens 10 with a desired configuration. Thus, by selecting the mold members 12 with a desired surface 14, lenses 10 with different characteristics, such as focal lengths, can be made by the apparatus 11. Such techniques are well known to those skilled in the art, and will therefore not be further discussed.

In one embodiment, the apparatus 11 of the present invention includes a device 20 for directing rays of ultraviolet light against the outer surface 15 of the mold members 12. The rays of ultraviolet light pass through the mold members 12 and act on a lens forming material 21 disposed in the mold cavity 16 in a manner discussed below so as to form a lens 10. Each device 20 includes an ultraviolet light producing device 22 disposed outboard of a mold member 12 and the rays (not shown) of ultraviolet light from each device 22 are reflected by a suitably shaped hood type reflector 23. The reflected rays of ultraviolet light pass through a suitable filter 24 to engage against the outer surface 15 of the mold members 12. In one embodiment of the present invention, each device 20 is similar to the radiation apparatus disclosed in U.S. Pat. No. 4,298,005 the disclosure of which is hereby specifically incorporated herein by reference.

In one embodiment of the present invention each light source or device 22 preferably comprises a high pressure mercury lamp with a heavy metal additive, such as iron. This type of lamp produces a significant amount of energy in the 320 nm range. A standard mercury ultraviolet source can also be used for a longer period to achieve the same results.

The filter 24 for each device 22 preferably comprises a Pyrex glass plate which filters out ultraviolet light having a wavelength below approximately 300 nm thereby to prevent excessive heat buildup in the mold cavity 16. The lens forming material 21 in the mold cavity 16 is cooled during the curing cycle to maintain a maximum temperature thereof of approximately 40° C. and this is accomplished by passing cooling air over the mold arrangement.

According to this embodiment, it is preferred that the ultraviolet ray generating devices 20 irradiate the lens forming material 21 with ultraviolet light in the range of approximately 300 nm to 450 nm as the effective wavelength spectrum for curing the material 21 lies in the 300 nm to 440 nm region.

While each filter 24 has been illustrated and described as being a one filter member, it will be recognized by those skilled in the art that each filter 24 could comprise a plurality of filter members or comprise any other device effective to filter out ultraviolet light having a wavelength below approximately 300 nm, as desired.

Also according to this embodiment, it is preferred that the glass mold members 12 are formed from a material that will not allow ultraviolet radiation having a wavelength below approximately 300 nm to pass therethrough. One such material is Schott Crown or S-1 glass that is manufactured and sold by the Schott Optical Glass Inc., of Duryea, Pa.

According to a preferred embodiment of the present invention, the outer surface 15 of the mold members 12 is frosted. The frosting of the outer surface 15 of the mold members 12 in combination with the ray directing device 20 provides an even distribution of the ultraviolet light throughout the mold cavity 16 thereby preventing optical distortions in the lens 10. It is also preferable to have uniform ultraviolet light radiation throughout the material 21 with approximately 50% of the radiation from each device 20 reaching the center of the material 21. To ensure that sufficient radiation is reaching the center of the material 21, it should be possible to measure 1 mW/sqcm of ultraviolet light on the side of the mold cavity opposite the ray directing device 20. Also, any component of the lens forming material 21 that absorbs ultraviolet light in the range of 300 to 450 nm except the photoinitiator should be eliminated from the lens forming material 21. In addition, by having the thickness of each mold member 12 substantially the same throughout the area thereof that passes such rays, such rays will be more evenly distributed than if the thickness thereof varied.

In general, photochemical and thermal curing systems are analogous except that light instead of heat is the main driving force for the polymerization reaction. Curing of a lens by ultraviolet light as opposed to thermal curing presents many problems, however, that must be overcome to produce a viable lens. The most troublesome of these problems include yellowing of the lens, cracking of the lens, production of patterns in the lens and premature release of the lens from the mold.

Yellowing of the finished lens has been found to be related to the monomer composition, the intensity of ultraviolet light, the identity of the photoinitiator and the concentration of the photoinitiator. The effect of the photoinitiator is the strongest but each of the others plays a part.

When casting a lens, particularly a positive lens that is thick in the center, cracking is a very serious problem. Addition polymerization reactions, including photochemical addition polymerization reactions, are exothermic. During the process, a large temperature gradient builds up and the resulting stress tends to cause the lens to crack. It is believed that with positive lenses the heat generated in the polymerization process cannot migrate to the surface of the lens and be dissipated quickly enough to avoid cracking.

Also, when the lens forming composition includes monomers that tend to be brittle, the lens is more prone to crack. DEG-BAC, without any additives or comonomers produces a very hard but somewhat brittle polymer that is very prone to cracking. In addition, DEG-BAC, without additives tends to stick very tightly to the molds. When a portion of a lens adheres tightly to the mold, cracking often occurs.

When the polymerization reaction occurs too rapidly, heat buildup inside the system which leads to cracking is inevitable. The likelihood of cracking increases as the temperature difference between the center of the lens forming material and room temperature increases. During the polymerization process, several forces tending to crack the lens, such as shrinkage, adhesion, and thermal gradients, are at work. Other forces tending to crack the lens occur when the irradiation is stopped and the lens is cooled, especially if the reaction cell is allowed to cool too quickly.

Another problem is that, upon cooling, if a portion of the gasket is in contact with the sample it will become cool and adhere to the sample. At this point the lens forming material begins to shrink but it is not at a uniform temperature. The center of the sample is hot while the surface is relatively cool. During this shrinkage, if part of the lens releases from the mold while being held by the gasket and mold at other points, the mold can shatter.

Distortions in the finished lens are very troublesome. If the incident ultraviolet light is not uniform throughout the lens, visible distortion patterns may appear in the finished lens. Although the incident ultraviolet light was made as uniform as possible, it was found difficult to produce an acceptable product from DEG-BAC alone. It was determined that it is preferable to include additives in the lens forming composition to reduce the distortions.

It was found that by mixing DEG-BAC with additives or comonomers, its cracking tendency was decreased. By varying the raw material composition of DEG-BAC with additives or comonomers, it was possible to produce a wide variety of materials ranging from hard and tough to rubber-like materials. The rate of polymerization of the composition including DEG-BAC was increased by incorporating one or more compounds containing an acrylate group such as tetraethylene glycol diacrylate (TTEGDA), tripropylene glycol diacrylate (TRPGDA), trimethylolpropane triacrylate (TMPTA), tetrahydrofurfuryl methacrylate (TFFMA) and tetrahydrofurfuryl acrylate (TFFA). Those skilled in the art will recognize that other compounds that tend to increase the rate of polymerization of a composition including DEG-BAC can also be included.

TTEGDA tends to increase the overall rate of polymerization and tends to reduce the amount of yellowing in the finished lens. TTEGDA, however, also tends to increase the cracking of the lens. TRPGDA also increases the rate of polymerization. TMPTA and TTFMA tend to prevent the development of patterns and fringes in the finished lenses. TFFA tends to reduce cracking and the development of patterns in the finished lenses. TFFA also tends to reduce the degree to which the lenses stick to the mold. Preferably, 12-25% by weight of TFFA is incorporated in the composition to yield the desirable effects noted above. Preferably, no more than 25% by weight TFFA is included since a proportion greater than 25% tends to decrease the hardness of the finished lens.

An obstacle to the production of lenses having no defects or aberrations is the formation of convective striations, or optical inhomogeneity. These defects are commonly referred to as "patterns" or "wavy patterns".

The formation of these defects usually occurs during the early stages of the polymerization reaction during the transformation of the lens forming composition from the liquid to the gel state. Once patterns form they are almost impossible to eliminate. When gelation occurs there is a rapid temperature rise, in positive lenses, that can reach 85° C. that often leads to the lens fracture. The exothermic polymerization step causes a temperature increase, which in turn causes an increase in the rate of polymerization, which causes a further increase in temperature. If the heat exchange with the surroundings is not efficient enough there will be a runaway situation that leads to the appearance of thermally caused striations and even breakage. Since the rate of polymerization increases rapidly at the gelation point, this is a critical phase of the reaction.

The best quality lenses were found to result from a smooth reaction process that is not too fast and not too slow. The heat generated by the process must not be generated so fast that it cannot be exchanged with the surroundings. The incident ultraviolet light intensity must be adjusted because too much light can also cause the reaction to run away. The seal between the gasket and the mold must be as complete as possible because a poor seal will result in poorly cured material at the edge of the lens.

Conditions that are favorable for the production of lenses that are free from patterns are when (1) a good seal between the gasket and the mold is achieved; (2) the mold has good edges and clarity; (3) a formulation is used having an appropriate concentration of initiator that will produce a reasonable rate of temperature rise; (4) the formulation is homogeneous; and (5) shrinkage is minimized.

Premature release of the lens from the mold will result in an incompletely cured lens and the production of lens defects. Factors that contribute to premature release are (1) a poorly assembled mold; (2) the presence of air bubbles around the sample edges; (3) the covering of a part of the sample from light; (4) imperfection in gasket lip or mold edge; (5) inappropriate formulation; and (6) high shrinkage.

The gasket has been found to have a significant effect during the curing process. Specifically, premature release occurs when the molds are held too rigidly by the gasket. There must be enough flexibility in the gasket to permit the molds to follow the lens as it shrinks. Indeed, the lens must be allowed to shrink in diameter slightly as well as in thickness. Breakage of the lens occurs in some cases because there is adhesion between the lens and the gasket. The use of a gasket that has a reduced degree of stickiness with the lens during and after curing is therefore desirable.

In a preferred technique for filling the lens forming composition in the mold cavity, the gasket is placed on the bottom mold and the formulation is poured into place. The top mold is forced into place and a small amount of the formulation is forced out around the edge. The excess is then removed, preferably, by vacuum. If too much force is applied, however, and too much liquid forced out, the lens will release prematurely. The small amount of liquid which escapes outside the lens body and collects between the top innerside of the gasket and the top mold edge also presents a problem. During the curing process this liquid will transform to a solid state and will affect the performance of the gasket as well as the mold. Thus, the alignment of the top mold is very important. Gasket deterioration usually occurs at the top side because of the inherent spill factor. To avoid the alignment and spill problems, the molds, preferably, are clamped in place using a desired amount of pressure and then the lens formulation is injected under sealed conditions.

Despite the above problems, the advantages offered by the radiation cured lens molding system clearly outweigh the disadvantages. The advantages of a radiation cured system include a significant reduction in energy requirements, curing time and other problems normally associated with conventional thermal systems.

According to the present invention, the lens forming material can comprise any suitable liquid monomer or monomer mixture and any suitable photosensitive initiator. In one embodiment of the present invention the lens forming material that is utilized to form the lens 10 comprises 1 to 8 percent of benzil dimethyl ketal by weight (or a compound from its related chemical family) dissolved in diethylene glycol bis(allyl)carbonate. Diethylene glycol bis(allyl)carbonate (DEG-BAC) is commercially available from Pittsburgh Plate Glass Co. of Pittsburgh, Pa. under the trade designation CR39. In this embodiment, the dissolved liquid lens forming material, preferably, is filtered for quality control and is placed in the mold cavity 16 by pulling the gasket 17 away from one of the mold members 12 and injecting the liquid lens forming material 21 into the cavity 16. Once the cavity 16 is filled with such material 21, the gasket 17 is replaced into its sealing relation with the mold members 12. The material 21 can then be irradiated with ultraviolet light in the manner described above for a time period that is necessary to cure the material 21. The ultraviolet light entering the mold cavity 16 preferably has a wavelength in the range of approximately 300 nm to approximately 450 nm. The surface 15 of the mold members 12 preferably is frosted. The frosted surfaces 15 in combination with the reflectors 23 act to distribute the ultraviolet light substantially evenly throughout the material 21 in the mold cavity 16 during such time period.

The lens forming material 21, preferably, is cured in the above manner by directing rays of ultraviolet light from one device 20 through the mold member 12 rather than utilizing both devices 20 as previously described.

Those skilled in the art will recognize that once the cured lens 10 is removed from the mold cavity 16 by disassembling the mold members 12, the lens 10 can be further processed in a conventional manner, such as by grinding its peripheral edge.

As previously stated one aspect of the first embodiment of the present invention is the prevention of yellowing of the lens forming material 21 during the curing thereof. One means of realizing this aspect is to provide a lens forming material that leads to reduced yellowing.

One component of the lens forming material that leads to reduced yellowing is the photoinitiator. Photoinitiators are the photochemical counterparts of catalysts such as the difficult to handle peroxides that are used mainly in thermal free radical polymerizations. Thermal catalysts are usually very unstable and often dangerous to handle, while the ultraviolet photoinitiators utilized according to the present invention are easily handled and quite safe.

In general, a photoinitiator having utility in the present invention will exhibit a broad ultraviolet absorption spectrum over the 300–400 nm range. High absorptivity of a photoinitiator in this range, however, is not desirable, especially when casting a thick positive lens.

In addition, the polymerization must take place very uniformly. If one portion of the lens polymerizes faster than another, visible distortions will be produced that remain in the cured lens. A strongly absorbing photoinitiator will absorb most of the incident light in the first millimeter of lens thickness, causing rapid polymerization in that region. The remaining light will produce a much lower rate of polymerization below this depth and will result in a lens that has visible distortions. An ideal photoinitiator will exhibit high activity, but will have a lower extinction coefficient in the useful range. A lower extinction coefficient of photoinitiators at longer wavelengths allows the ultraviolet radiation to penetrate deeper into the reaction system. This deeper penetration of the ultraviolet radiation allows photoinitiator radicals to form uniformly throughout the sample and provide excellent overall cure. Since the sample can be irradiated from both top and bottom, a system in which appreciable light reaches the center of the lens is essential. The photoinitiator solubility and compatibility with the monomer system is also an essential requirement.

An additional consideration is the effect of the photoinitiator fragments in the finished polymer. Some photoinitiators generate fragments that impart a yellow color to the finished lens. Although such lenses actually absorb very little visible light, they are cosmetically undesirable.

Photoinitiators are often very system specific so that photoinitiators that are very efficient in one system may be much poorer in another. The best available photoinitiators for the system according to the first embodiment of the present invention appear to be 2-hydroxy-2-methyl-1-phenyl-propan-1-one and 1-hydroxycyclohexyl phenyl ketone. The identity of the initiator and its concentration are very important for any particular formulation. A concentration of initiator that is too high leads to cracking and yellowing of the lens. Concentrations of initiator that are too low lead to incomplete polymerization and a soft material.

In particular, according to the first embodiment of the present invention, the liquid monomer comprises diethylene glycol bis(allyl)-carbonate and the initiator utilized therewith can comprise 2-hydroxy-2-methyl-1-phenyl-propan-1-one with such initiator comprising approximately 1% to 3% by weight of the lens forming material. The balance of the composition is provided by the monomer alone or preferably with additives as discussed below. The above-noted initiator is commercially available from EM Chemicals under the tradename Darocur 1173.

Also, according to the first embodiment of the present invention, the liquid monomer comprises diethylene glycol bis(allyl)carbonate and the initiator utilized therewith can comprise 1-hydroxycyclohexyl phenyl ketone with such initiator comprising approximately 2% to 6% by weight of the lens forming material. The balance of the composition being provided by the monomer alone or preferably with additives as discussed below. The above-noted initiator is commercially available from Ciba-Geigy under the tradename Irgacure 184.

In the system according to the first embodiment of the present invention, each of the above two initiators reduce or substantially eliminate yellowing of the lens forming material during the curing operation because a large amount of the same is not required in combination with the above described monomer.

For example, according to the first embodiment of the present invention, when diethylene glycol bis(allyl)-carbonate is used with the photoinitiator Darocur 1173, the preferred amount of Darocur 1173 is approximately 2.5% by weight of the lens forming material. When diethylene glycol bis(allyl)-carbonate is used with the photoinitiator Irgacure 184, the preferred amount of Irgacure 184 is approximately 3.3% by weight of the lens forming material.

Also according to the first embodiment of the present invention, each of the last two above described combinations of the liquid monomer and the photosensitive initiator preferably include one or more additives to improve the plastic lens being made therefrom. For example, it may be desirable to reduce the crystallization effect of the resulting plastic lens as the same is being cured.

In particular, one such additive is 2-ethyl-2-(hydroxymethyl)-1,3-propanediol triacrylate with such additive comprising approximately 2% to 4% by weight of the lens forming material and being commercially available from Aldrich or Interez. In this system, this additive reduces the amount of optical distortion in the plastic lens as the additive tends to reduce the aforementioned crystallization effect.

Another additive that can be used by itself or in combination with the previously described additive is 1,6-hexanediol diacrylate (HDDA) with such additive comprising approximately 2% to 7% by weight of the lens forming material and being commercially available from Rohm Tech.

Other additives such as TFFA (available from Sartomer), TFFMA (available from Sartomer) and TMPTA (available from Aldrich or Interez) may be included to suppress the development of patterns and fringes in the lens and reduce the degree to which the lenses stick to the mold, respectively, as discussed above.

The first embodiment of the invention will now be described in more detail with reference to the following examples. These examples are merely illustrative of the composition and method of the invention and are not intended to be limiting.

EXAMPLE 1

The photo-initiating efficiency of various commercially available initiator compounds in the polymerization of diethylene glycol bis(allyl)carbonate (DEG-BAC) was investigated at a constant light intensity of 17mW/cm$^2$, and initiator concentration of 3% (w/v). The rate of polymerization was monitored by IR-spectroscopy using the absorption band of the stretching vibration of the olefinic double bond at 1650 cm$^{-1}$. The results showed that 2-hydroxy-2-methyl-1-phenylpropan-1-one and 1-hydroxycyclohexyl phenyl ketone have the highest efficiency as initiators for the polymerization of DEG-BAC. In contrast, benzoin and benzoin ethers produced much lower rates of polymerization and are therefore poor initiators for DEG-BAC.

Apparatus

A Hanovia medium pressure mercury lamp, containing a small amount of iron iodide to improve the spectral output in the UV-region around 350 nm, was used as a UV-light source. The lamp was housed in an air cooled housing equipped with an elliptical reflector. The lamp was operated with a special stabilizer ballast to supply constant power at three different intensities of 125, 200, and 300 Watts/inch. A ¼inch filter of Pyrex glass was placed in the path of the beam to absorb short wavelength UV-light. The total incident light intensity was measured by a digital radiometer equipped with a 1 cm$^2$ diffuse-sensor window. This radiometer operates in the spectral range of 320 to 380 nm with a full range reading from zero to 200 mW/cm$^2$.

All IR-spectroscopy was performed on a Nicolet 7199 Fourier Transform spectrophotometer equipped with a triglycine sulfate detector.

UV-spectra of the initiator/monomer solutions were recorded on a Shimadzu UV-160, a microcomputer controlled double beam UV-Vis spectrophotometer.

Methods

A solution of 3% initiator in monomer was made up on a weight/volume basis. After the initiator was dissolved in the monomer, the solution was transferred into a test tube and flushed with nitrogen for 15 minutes to sweep out dissolved oxygen. A few drops of the solution were sandwiched between two sodium chloride disks which were separated by a 0.05 mm stainless steel spacer, and then secured in a demountable cell mount. After the cell was assembled, an IR-spectrum was taken. The sample cell was then irradiated for the desired time, removed, and immediately analyzed on the IR-spectrophotometer. This exposure-IR-spectrum cycle was repeated seven or eight times for each sample. Duplicate experiments with different initiators were carried out following the same procedure. The peak area of the IR-bands were calculated using the SETUP computer program which was run from a DEXTER/2 system.

Results

Figure 4:
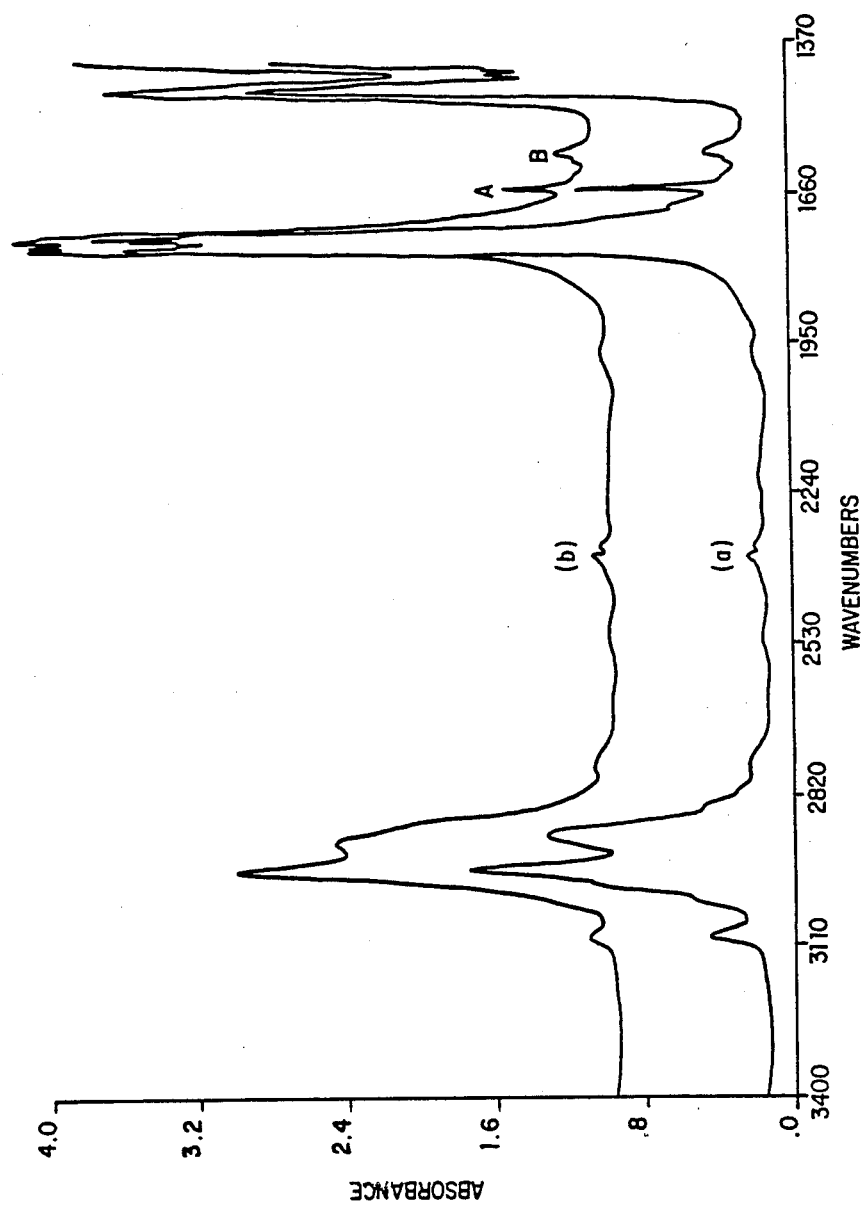
FIG. 4 is an infrared-absorption spectra of DEG-BAC before and after irradiation in the presence of 2-hydroxy-2-methyl-1-phenylpropan-1-one.
Figure 5:
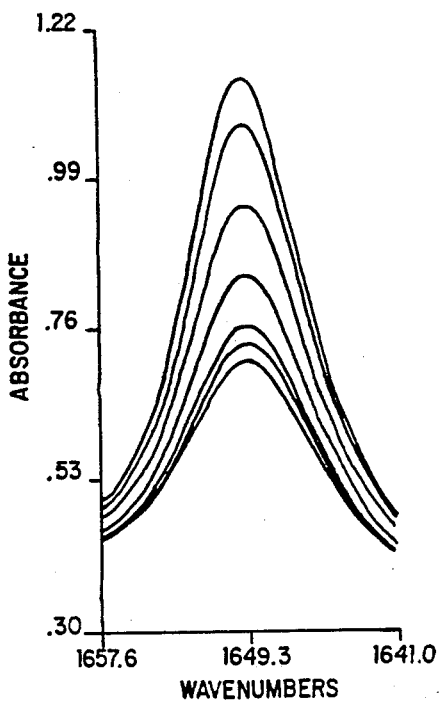
FIG. 5 is a portion of an infrared-absorption spectra of DEG-BAC before, during and after irradiation in the presence of 2-hydroxy-2-methyl-1-phenylpropan-1-one.

FIG. 4 shows an IR-absorption spectra of DEG-BAC before and after irradiation in the presence of 2-hydroxy-2-methyl-1-phenylpropan-1-one, which is commercially available from EM Chemicals under the trademark Darocur 1173. The point of interest is the large decrease of absorption at 1650 cm$^{-1}$ (band A), which is the C=C stretching vibration in the allyl portions of the DEG-BAC. As shown in FIG. 5 this absorption band is an excellent index of the extent of polymerization of DEG-BAC. Other changes in the IR absorption spectra occur, but as the absorption band at 1650 cm$^{-1}$ is due to a fundamental vibration mode, it is the most reliable criteria of the unsaturation content.

The percent residual unsaturation of DEG-BAC was calculated using the following equation:

$$\% \text{ residual unsaturation} = (A_t/A_o) \cdot 100 \tag{1}$$

where $A_o$ and $A_t$ are the absorption peak areas of the band A (base line 1659–1641 cm$^{-1}$), initially and after an irradiation of t seconds, respectively.

Although the demountable cell was used with a fixed spacer, the apparent thickness of the sample was observed to change due to the increase in density as the polymerization proceeds. A band at 1581 cm$^{-1}$ (band B), which did not change appreciably during polymerization, was used as an internal standard. To obtain the correct % unsaturation a correction factor of $B_o/B_t$ was applied to equation 1.

$$\% \text{ residual unsaturation} = \frac{(A_t/B_o) \cdot 100}{(A_o/B_t)} \tag{2}$$

where $B_o$ and $B_t$ are the absorption peak areas of band B (base line 1592–1572), initially and at time t during the polymerization, respectively. A representative sample of data is given in Table I below.

TABLE I

Data for the Polymerization of DEG-BAC with 3% 2-Hydroxy-2-methyl-1-phenylpropan-1-one and light intensity of 17 mW/cm$^2$

| Exposure (second) | Absorption area of band A | Absorption area of band B | Unsaturation (%) |
|---|---|---|---|
| 0 | 5.1259 | 1.5541 | 100.00 |
| 60 | 4.6551 | 1.5535 | 90.85 |
| 90 | 4.3616 | 1.5414 | 85.79 |
| 120 | 4.0011 | 1.5118 | 80.24 |
| 180 | 3.5442 | 1.4889 | 72.17 |
| 300 | 2.8985 | 1.4730 | 59.66 |
| 480 | 2.3365 | 1.4513 | 48.81 |

As a further check on the validity of this technique or equation 2, two additional analytical methods were used; refractive index and iodometry. The refractive index method was based on data published by Starkweather and Eirich, *Ind. Eng. Chem.*, 47: 2452 (1955) from which the conversion factor was deduced. The iodine value method was that described in ASTM D1541-60. The results are shown in Table II below.

TABLE II

Percent Residual Unsaturation of the Irradiated DEG-BAC by Three Different Methods.

| Method IR | Refractive Index | Iodometry |
|---|---|---|
| 92.5 | 92.2 | — |
| 91.3 | 93.0 | — |
| 89.5 | 89.5 | — |
| 88.8 | 89.5 | — |
| 83.3 | — | 87.0 |
| 73.3 | — | 76.1 |
| 57.1 | — | 60.4 |
| 29.0 | — | 30.0 |

Comparison of these two methods with the IR method using equation 2 shows reasonable agreement.

The initial rates of polymerization after sequential UV-irradiation were taken from the slopes of the initial part of the % unsaturation-time curves. Table III summarizes the results obtained for the polymerization of DEG-BAC with various initiators at room temperature.

TABLE III

Initial Rates ($R_p$) of Photopolymerization of DEG-BAC with 3% Initiator and Light Intensity of 17 mW/cm$^2$ in the 320–380 nm Region.

| Initiator | λ max | (log ε) | $R_p \times 10^4$ M/sec |
|---|---|---|---|
| 2-Hydroxy-2-methyl-1-phenylpropan-1-one | 313 | (1.87) | 68.8 |
| 1-Hydroxycyclohexyl phenyl ketone | 328 | (1.94) | 60.9 |
| 2,2-Di-sec-butoxyacetophenone | 335 | (1.94) | 47.9 |
| 2,2-Diethoxyacetophenone | 334 | (1.87) | 40.7 |
| 2,2-Diethoxy-2-phenyl-acetophenone | 343 | (2.38) | 39.5 |
| 2,2-Dimethoxy-2-phenyl-acetophenone | 318 | (2.34) | 37.3 |
| Benzoin methyl ether | 339 | (2.34) | 18.5 |
| Benzoin isobutyl ether | 340 | (2.31) | 11.3 |
| Benzoin | 312 | (2.58) | 9.65 |
| Benzil | 382 | (1.86) | 5.96 |
| Benzyl disulfide | 242 | (3.54) | 4.05 |
| 2,4-Dihydroxybenzophenone | 324 | (3.99) | 4.00 |
| Benzylideneacetophenone | 308 | (4.08) | 3.73 |
| Acetophenone | 315 | (1.72) | 0.81 |

Conditions for all runs were 3% initiator(w/v) and 17 mW/cm$^2$ effective intensity in the 320–380 nm region. The results show that Darocur 1173 and 1-hydroxycyclohexylphenyl ketone, which is commercially available from Ciba-Geigy under the trademark Irgacure 184 are the best photoinitiators for DEG-BAC in the group studied. Benzoin ethers, however, which showed high efficiency as initiators for vinyl polymerization, are much less effective in the photopolymerization of DEG-BAC.

EXAMPLE 2

The objective of this example was to develop a composition including DEG-BAC and a procedure for the production of molded eyeglass lenses by ultraviolet photoinitiation.

Composition

It was found to be difficult to prepare an acceptable product by using DEG-BAC and photoinitiator alone in conjunction with the present radiation system. It was determined that the addition of other monomers was essential to obtain the most desirable combination of optical and mechanical properties in the finished lens. The additional monomers were selected from mono- functional and multifunctional acrylates or methacrylates.

The final composition of the raw material was miscible, clear, and dust free. In addition, the ultraviolet transmission of the components except for the photoinitiator were at a maximum in the desired range.

The preferred composition is shown in Table IV.

TABLE IV

| Materials | Supplier | Weight (%) range |
|---|---|---|
| 2-hydroxy-2-methyl-1-phenyl propan-1-one (Darocur 1173) | EM Chemicals | 0.7–1.3 |
| 1-hydroxy-cyclohexyl-phenyl ketone (Irgacure 184) | Ciba-Geigy | 1.2–1.8 |
| Trimethylol propane-triacrylate (TMPTA) | Aldrich, Interez | 2.5–3.0 |
| Tetrahydrofurfuryl-methacrylate (TFFMA) | Sartomer (Arco) | 3.0–2.5 |
| Tetrahydrofurfuryl-acrylate (TFFA) | Sartomer | 12.0–25 |
| Diethylene glycol bis(allyl) carbonate (DEG-BAC) | PPG Inc. | 80.3–72.3 |

Reaction Cell

The reaction cell included two glass windows shaped to produce the lens and a flexible silicon or vinyl gasket. The glass molds reproduced the lens surfaces. The inside curvature of the molds together with the gasket thickness controlled the lens shape and power. To produce good quality lenses it was important that the glass molds had no surface scratches of other defects.

ULTRAVIOLET LIGHT RADIATION SYSTEM

The spectral range of interest for ultraviolet radiation curing is 320–400 nm where the most efficient photoinitiators absorb and molds of crown glass allow maximum transmission.

Of the high intensity sources of light available, iron added-mercury arc lamps offer a high output within this preferred range and thus were used in this system. Shorter wavelengths below 320 nm were blocked by a ¼ inch Pyrex glass filter placed at 6–8 inches from the lamp and 5–7 inches from the reaction cell. This blockage of the short wavelengths was found to be absolutely essential. If the full intensity of the ultraviolet light source was allowed to strike the glass mold it broke due to the strong absorption of the shorter wavelengths by the glass. Even small amounts of radiation at this wavelength caused heating problems that were too severe to overcome.

Additional advantages offered by the Pyrex glass filter included a significant reduction in unwanted IR heat problems normally produced by the lamp. Heat was continuously removed, without disturbing the lamp stability, by blowing air past the filter and the reaction cell. The ultraviolet rays emanating from the lamp were passed through two or three sheets of closely spaced tracing paper at 3 inches from the reaction cell or 2-4 inches from the Pyrex glass filter. The tracing paper increases the uniformity of light distribution with a further reduction in the heating problems.

The light intensity in the 320–400 nm range, under the above conditions, was reduced from 27 mW/sqcm (in the absence of the Pyrex glass filter and the tracing paper) to about 6–10 mW/sqcm with an excellent performance compared with an unmodified radiation system even at comparable light intensity.

Alternatively, it was determined that the high-pressure mercury arc lamps could be replaced by fluorescent tubes without a loss in performance. Sylvania and Philips both produce acceptable fluorescent tubes that generate almost all of their output in the desirable range (320 to 390 nm). A bank of these lamps was capable of producing at least 8 mW/sqcm and were effective in this system. These fluorescent tubes provide many advantages over the high-pressure mercury arc lamps as they are inexpensive, compact, and require much less power.

Two illumination sources were used to provide ultraviolet light exposure simultaneously to both sides of the reaction cell. The critical point in the irradiation was found to occur shortly after the gelation point when the rate of polymerization increased drastically and the mobility of the reacting monomer units decreased which resulted in a rapid increase in temperature, especially in thicker samples. At this point cracking of the sample occured if the temperature difference became too great. This critical stage was controlled by monitoring the temperature at the mold surface and keeping the difference in temperature between the mold surface and the surroundings to less than 2° C. At room temperature this meant keeping the temperature at the mold surface below 50° C. (120° F.) An alternative was to reduce the intensity of the ultraviolet light radiation, but this resulted in a longer irradiation time. Another possibility was to reduce the concentration of photoinitiator, which also increased the irradiation time and caused other problems.

The reaction cell was placed where at least 20% of the incident light passed through the cell, to ensure that regions farthest from the lamps received adequate radiation. Using a value of 6mW/sqcm of incident light it was required that there be 1.2 mW/sqcm passing through the cell.

Two lamps were used to provide sufficient radiation energy throughout the lens so that any deficiency in energy on one side was compensated for by the lamp on the other side. It was found to be very difficult to obtain uniform irradiation with only one lamp.

The monomer mixture contained co-monomers that improved the most needed properties. TMPTA was useful in reducing the effect of unequal radiation over the body of the lens. Without TMPTA, visible distortions occured. TFFA was added to add flexibility to the mixture to prevent cracking of the lens. Between 12 and 25% by weight of TFFA was effective. Above 25% caused too much flexibility and less than 12% failed to prevent cracking. An added bonus was that the addition of TFFA also improved the mold release. A drawback was that TFFA slightly increased the yellowing of the lens.

Procedure

The procedure for producing lenses was as follows:
1. The necessary amount of initiator was dissolved in TFFA using adequate agitation.
2. The necessary amount of DEG-BAC and other ingredients was poured into the photoinitiator-TFFA solution (with adequate agitation) to obtain a clear fluid free of undissolved particles. In some cases, it was helpful to warm the mixture to about 10° C. above room temperature to ensure that the mixture attained a good homogeneous state.
3. Enough lens solution was placed in the cell container which was composed of the concave part of the cell window supported by the desired flexible gasket. The other window was carefully arranged to allow air to escape freely using a micro spatula inserted between the glass mold and the gasket. Then the cell was full and after removing the spatula it returned to a sealing condition.
4. The windows were checked and any spillage was removed by vacuum suction.
5. The reaction cell was placed in position between the two radiation sources and the reaction was begun using both sources. The surface temperature was not allowed to exceed 50° C. in the first 5-10 minutes.
6. At the completion of the curing process (20-60 min. depending on thickness of lens, curvature of lens, the reaction temperature and program of radiation) the reaction cell was allowed to cool down to room temperature.
7. The gasket was removed and the windows were carefully removed using a razor or knife inserted between the cured lens and the glass window with a gentle mechanical shock.

It was found according to the above-described first embodiment of the present invention that the DEG-BAC monomeric material has characteristics that make its use in plastic lenses undesirable. Specifically, DEG-BAC is very slow to polymerize and therefore requires a high proportion of initiator which leads to increased yellowing. It was also difficult to produce acceptable positive correction lenses which include DEG-BAC due to its slow reaction rate and the required thickness of the lens.

According to another embodiment of the present invention, DEG-BAC is replaced by the monomer 4,4'-isopropylidene diphenol diallyl carbonate (bisphenol A diallyl carbonate) in admixture with faster reacting monomers such as trimethylol propane triacrylate (TMPTA), hexanediol dimethacrylate (HDDMA), tetraethylene glycol diacrylate (TTEGDA), tripropylene glycol diacrylate (TRPGDA) and styrene. Generally, compounds containing acrylate groups polymerize much faster than those containing allyl groups. By including fast polymerizing monomers in the lens composition, yellowing is reduced because less initiator is required.

Compositions which included a high proportion, on the order of 70% by weight, of TTEGDA, however, were far too flexible at 100° C. TTEGDA has a very long and flexible backbone between its two acrylate groups, so this characteristic was to be expected. Preferably, other monomers that provide more stiffness are included and the proportion of TTEGDA is reduced. Stiffness is provided, preferably, by incorporating monomers that have shorter and stiffer backbones such as HDDMA or TRPGDA. Stiffness is also provided, preferably, by incorporating monomers that have more than two functional groups such as TMPTA.

To reduce the formation of cracks in the lenses, it is preferable to reduce the rate of polymerization and reduce the maximum temperature of the lens composition during the curing process. Generally, if there is a large enough temperature difference between the hardening lens and its surroundings, the lens will crack.

The rate of polymerization and the maximum temperature are reduced, preferably, by optimizing three factors: monomer composition, initiator concentration and incident light intensity. The rate of polymerization, preferably, is sufficiently reduced by decreasing the concentration of photoinitiator and by decreasing the intensity of the incident light. TTEGDA and TRPGDA are very fast reacting monomers although TRPGDA is slightly slower than TTEGDA. The higher the proportion of TTEGDA, the faster the reaction, the higher the shrinkage of the lens, the greater the heating effect and the more susceptible the lens is to cracking or premature release from the mold. Slower reacting monomers, preferably, are mixed with these very reactive monomers to bring the rate of polymerization under control and reduce the rate of heat generation. A balance is achieved between slower monomers and very reactive monomers to avoid lens cracking while at the same time provide a rapid enough rate of polymerization to minimize the concentration of initiator and diminish yellowing.

Conventional high pressure mercury arc lamps used to cure plastic lenses had a detrimental effect on the quality of the produced lens. Aside from being cumbersome, expensive and dangerous, these high intensity lamps contributed to the rapid rise in temperature as well as the rate of polymerization. The conventional lamps are replaced by bulbs that generate approximately 5-10 mW/sqcm of ultraviolet light having wavelengths between 300 and 400 nm that is very uniformly distributed throughout the reaction process. Such bulbs are commercially available from Sylvania under the trade designation Sylvania Fluorescent (F158T/2052) or Sylvania Fluorescent (F258T8/350BL/18") GTE. As noted above, ultraviolet light having wavelengths between 300 and 400 nm is preferred because the preferred photoinitiator of the composition of the present invention absorbs most efficiently at this wavelength and the molds used according to the present invention allow a maximum transmission at this wavelength.

It is preferred that a filter be placed between the light source and the reaction cell to absorb all or substantially all incident light having a wavelength less than 300 nm. Light having a wavelength below 300 nm does not induce polymerization but is absorbed by the monomers and produces a great deal of heat. Also, if the full intensity of the ultraviolet source is allowed to strike the mold, it may break the mold due to a strong absorption of short wavelength radiation by the glass. The filter, preferably, is a glass filter that can withstand a fair degree of temperature gradation with its surroundings and absorb all wavelengths below 300 nm, such as a borosilicate filter or a commercially available filter from Pyrex, Kimax or Crown Glass.

It is preferred according to the present invention that the light source generates light having a uniform intensity. It is also preferred that the incident light be uniform to reduce the possibility of lens cracking. Moreover, it is preferred that the level of ultraviolet radiation be as uniform as possible through the lens composition during the curing process because non-uniform light leads to defects in the finished lens. It is preferred that several light sources configured as a bank of lights be utilized to generate the uniform light. It is also preferred that a suitable light diffuser be disposed between the light source and the reaction solution to maximize the uniformity of light distribution. Suitable light diffusers are frosted glass molds or one or more sheets of tracing paper.

In a preferred embodiment, an alternating source of illumination is used to minimize overheating problems. According to this technique, the mold with the lens forming composition disposed therein is illuminated from one side for an interval, the light source is then masked or shut off and the opposite side of the reaction cell is illuminated for the same interval. The process is repeated until the curing of the lens forming composition is complete. Alternatively the reaction cell can be turned over periodically until the lens is completely cured. The technique of using alternating illumination makes the irradiation of the lens forming composition more uniform without simultaneously using two light sources which can lead to overheating.

It is preferred that the maximum temperature of the lens forming composition during the cure thereof be less than 50° C. to reduce the tendency of the lens to fracture. Aside from the above-noted techniques for reducing the temperature, filters disposed between the light source and the reaction cell, as well as cooling fans to carry heat away from the reaction cell are also viable techniques for reducing the heating effects. Finally, when curing thick positive lenses, intermittent rather than continuous radiation is effective to reduce the heating effect.

According to the second and preferred embodiment of the present invention, the liquid lens forming composition includes bis phenol A diallyl carbonate as the major liquid monomer in place of DEG-BAC. The bisphenol A diallyl carbonate has a higher refractive index than DEG-BAC which allows the production of thinner lenses which is especially important with relatively thick positive or negative lenses.

Commercial preparations having utility in the present invention which include bisphenol A diallyl carbonate as their major component are available from Pittsburgh Plate Glass Co. (PPG) under the trade name HIRI II. HIRI II is available as a low flash point and a high flash point material.

The HIRI II low flash point material is quite flammable and includes an ultraviolet light blocker that absorbs strongly at 326 nm in the region where the photoinitiators absorb. Thus, the UV blocker, preferably, is removed before this material is used in a photochemical polymerization reaction. This component, preferably, is removed by passing it through a column of alumina basic HIRI II alone is difficult to pass through an alumina column unless high pressure is applied. A mixture of TTEGDA and HIRI II has a much lower viscosity and is much easier to treat.

It is preferred that the HIRI II low flash point material not be used to produce a plastic lens according to the present invention due to the risk of fire with this product and the consequent hazard to personnel.

The HIRI II is a high flash point (225° F.) material is essentially nonflammable, virtually colorless and has an organic odor. The HIRI II high flash point material also includes a UV absorber which, preferably, is removed by passage through a column of alumina (basic) before it is used to induce an efficient photopolymerization. Because of its high viscosity, the HIRI II high flash point material is preferably mixed with the less viscous TTEGDA before passing it through an alumina column.

In its commercially available form, HIRI II includes approximately 91% bisphenol A diallyl carbonate, 7% DEG-BAC, 2% antiyellowing additives and the UV absorber.

When used in the composition of the present invention, the UV absorber, the DEG-BAC and the antiyellowing additives are preferably removed from the HIRI II leaving the bisphenol A diallyl carbonate. Lenses made from this product sometimes had a very slight, barely detectable, degree of yellowing. A small amount of a blue dye consisting of 9,10-anthracenedione, 1-hydroxy-4-[(4-methylphenyl)amino] available as Thermoplast Blue 684 from BASF Wyandotte Corp. is preferably added to the composition to counteract the yellowing.

According to a preferred embodiment, the composition of the present invention includes (a) a monomer mix of bisphenol A diallyl carbonate, HDDMA, TMPTA, TTEGDA, TRPGDA and styrene; (b) a photoinitiator; and (c) a mold release agent. According to a more preferred embodiment, the composition includes from about 22–29% by weight of bisphenol A diallyl carbonate, from about 13–26% by weight of HDDMA, from about 15–19% by weight of TMPTA, from about 12–19% by weight of TTEGDA, from about 12–19% by weight of TRPGDA, from about 2–3% by weight styrene; from about 0.02–0.04% by weight of 1-hydroxycyclohexylphenyl ketone as a photoinitiator; and an effective amount of a mold release agent.

According to a most preferred embodiment, the composition includes 26% by weight of bisphenol A diallyl carbonate, 25% by weight of HDDMA, 16% by weight of TMPTA, 15% by weight of TTEGDA, 16% by weight of TRPGDA, 2% by weight of styrene, 0.03% by weight of 1-hydroxycyclohexylphenyl ketone and an effective amount of a mold release agent.

As discussed above, bisphenol A diallyl carbonate has a much higher refractive index than DEG-BAC and thus allows the production of thinner lenses when compared to DEG-BAC lenses. If more than 30% by weight of bisphenol A diallyl carbonate is included in the composition, however, compatability or solubility problems between the various monomers develop resulting in a cloudy, foggy or milky lens.

TTEGDA is a diacrylate monomer that, preferably, is included in the composition because it is a fast polymerizing monomer that reduces yellowing and yields a very clear product. If too much TTEGDA is included, i.e. greater than about 18% by weight, however, the finished lens will be prone to cracking and will be too flexible as this material softens at temperatures above 40° C. If TTEGDA is excluded altogether, the finished lens is much too brittle.

HDDMA is a dimethacrylate monomer that has a very stiff backbone between the two methacrylate groups. HDDMA, preferably, is included in the composition because it yields a stiffer polymer and increases the hardness and strength of the finished lens. This material is also more compatible with bisphenol A diallyl carbonate than the other monomers of the composition. HDDMA contributes to high temperature stiffness, polymer clarity and speed of polymerization.

TRPGDA is a diacrylate monomer that, preferably, is included in the composition because it provides good strength and hardness without adding brittleness to the finished lens. This material is also stiffer than TTEGDA.

TMPTA is a triacrylate monomer that, preferably, is included in the composition because it provides much more crosslinking in the finished lens than the difunctional monomers. TMPTA has a shorter backbone than TTEGDA and increases the high temperature stiffness and hardness of the finished lens. Moreover, this material contributes to the prevention of patterns in the finished lens. TMPTA also contributes to high shrinkage during polymerization. The inclusion of too much of this material, i.e. in excess of 20% by weight makes the finished lens too brittle so that it breaks under the drop-ball test.

Styrene is a high refractive index comonomer that, preferably, is included in the composition because it acts as a coordinating material. If styrene is not included in the composition, incompatiability problems arise which result in a cloudy lens. Styrene acts as a bridging agent which allows the bisphenol A diallyl carbonate to polymerize with the other monomers. Too much styrene, i.e. greater than about 3% by weight will result in a loss of strength in the finished lens, because styrene is a single vinyl group monomer.

Certain of the monomers that are preferably utilized in the composition of the present invention, such as TTEGDA, TRPGDA and TMPTA, include impurities and have a yellow color in certain of their commercially available forms. The yellow color of these monomers is preferably removed by passing them through a column of alumina (basic) which includes aluminum oxide powder - basic. After passage through the alumina column, the monomers absorb almost no ultraviolet light. Also after passage through the alumina column differences between monomers obtained from different sources are substantially eliminated. It is preferred, however, that the monomers be obtained from a source which provides the monomers with the least amount of impurities contained therein. The styrene, preferably, is also passed through a column of alumina (basic) before use. The composition preferably is filtered prior to polymerization thereof to remove suspended particles.

The photoinitiator included in the composition, preferably, is 1-hydroxycyclohexylphenyl ketone which is available from Ciba Geigy as Irgacure 184. The initiator concentration to a large extent is dependent on the incident light intensity. For instance, with an incident light intensity of 2.0 to 2.5 mW/sqcm the concentration of photoinitiator in the composition, preferably, is about 0.03% by weight. An excess of Irgacure 184, i.e. more than 0.03% by weight will cause yellowing in the lens and will cause the reaction to proceed too rapidly leading to a cracked lens.

A mold release agent, preferably, is included in the composition so the finished lens will not stick to the mold or gasket after it has cured. The effective amount of mold release agent is very small. Large amounts of mold release agent lead to deposits on the molds that are present on the finished lenses. Suitable mold release materials may be selected from butyl stearate, ZELEC UN or ZELEC NE, which are products containing alcohol phosphates that are available from DuPont and dioctylphthalate. In the absence of clamping, the composition, preferably, includes 50–150 ppm of butyl stearate, 0.5–1.5 ppm of ZELEC UN or ZELEC NE, or 0.3–1.5 ppm of dioctylphthalate.

It is preferred that only one of the enumerated mold release agents and not a combination thereof is used. It is preferable to incorporate the mold release agent in the lens composition rather than spraying it on the surface of the mold faces. While coating the mold faces with a mold release agent such as butyl stearate provides effective mold release it also generates microscopic surface anomalies in the lenses. Such surface anomalies detract from the quality of the finished lens and lenses produced from such system do not tint uniformly.

As noted above, TTEGDA and TRPGDA are highly reactive monomers, with TTEGDA being slightly more active than TRPGDA. Slower reacting monomers such as TMPTA and HDDMA, preferably, are mixed with the very reactive monomers to bring the rate of polymerization under control and reduce the rate of heat generation. The degree of yellowing, preferably, is diminished by increasing the proportion of TTEGDA or TRPGDA to increase the reaction rate and reduce the concentration of initiator. Lens hardness depends on a balance between initiator concentration, exposure time, and formulation. The ultraviolet light cured lenses of the present invention demonstrate excellent organic solvent resistance to acetone, methylethyl ketone, and alcohols. The lenses produced according to the present invention, preferably, are cured in approximately 15 to 20 minutes.

A reaction cell was also developed according to the present invention. The reaction cell can be used with a proper mold arrangement to prepare positive or negative lenses that are free from defects.

Figure 6:
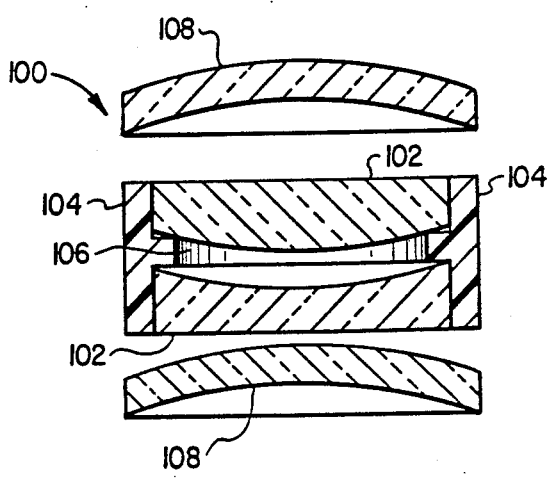
FIG. 6 is a fragmentary cross-sectional view of an apparatus for producing a plastic lens according to the present invention.

A first embodiment of the reaction cell of the present invention is shown in FIG. 6. As shown in FIG. 6, the reaction cell generally indicated at 100 includes opposed glass mold parts 102 and a gasket device 104 which together form a lens molding chamber 106. The lens forming composition of the present invention is disposed within the lens molding chamber 106. The glass mold parts 102, gasket device 104 and lens molding chamber 106 are sandwiched between opposed radiation lenses 108. In this manner, incident light entering the reaction cell 100 must first pass through one of the radiation lenses 108.

Figure 7:
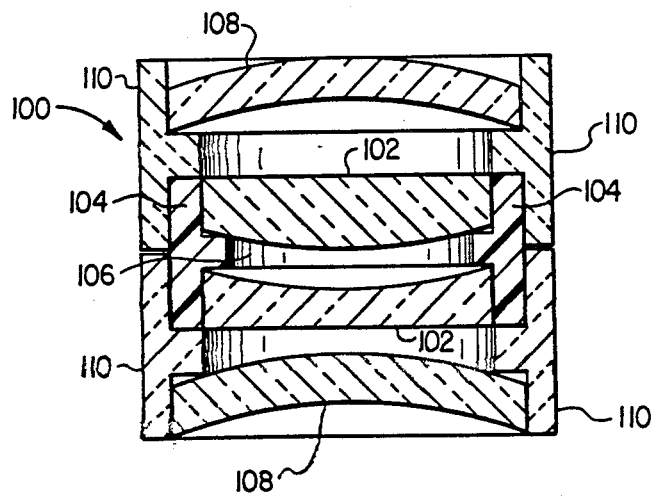
FIG. 7 is a fragmentary cross-sectional view of an apparatus for producing a plastic lens according to the present invention.

FIG. 7 illustrates a second embodiment of the reaction cell of the present invention which includes components identical to some components of the previous embodiment which components are given the same reference numerals. As shown in FIG. 7, the reaction cell 100 includes the opposed glass mold parts 102 and a gasket device 104 which together form the lens molding chamber 106. The lens forming composition of the present invention is disposed within the lens molding chamber 106. The glass mold parts 102, gasket device 104 and lens molding chamber 106 are sandwiched between opposed powerless glass molds 108 and thermally insulated by a pair of gaskets 110. The powerless glass molds 108 and gaskets 110 together form a thermally insulated radiation chamber. Preferably, the powerless glass molds 108 have a larger diameter than the lens molding chamber 106 so that incident light is allowed to reach the full extent of the chamber 106. Preferably, tracing paper (not shown) is inserted between the powerless glass molds 108 and the glass mold parts 102. In an alternate preferred embodiment, instead of inserting tracing paper between the powerless glass molds 108 and the glass mold parts 102, the powerless glass molds 108 are replaced by frosted glass molds.

The reaction cell assembly 100 is preferably constructed to minimize heat exchange between the reaction cell and its surroundings. Heat exchange between the reaction cell and its surrounding has been found to contribute to edge defects. Other factors that have been found to contribute to edge defects are light screening, poor sealing conditions, improper gasket material and poor gasket condition. The reaction cell 100 is preferably completely sealed by the powerless glass molds 108 and the gaskets 110 to prevent leakage of air into the reaction cell 100. If air leaks into the reaction cell 100 and especially between glass mold parts 102, it prevents the polymerization of the composition it contacts. The residual uncured liquid leads to weak lens edges and other edge defects.

Preferably, the gaskets 104 and 110 are constructed of vinyl material, have good lip finish and maintain sufficient flexibility at conditions around the T(max) of 45° C. Premature release often occurs when the molds are held too rigidly by the gasket. There must be sufficient flexibility in the gaskets to permit the molds to follow the lens as it shrinks. Insufficient sealing, unsuitable gasket material and/or a small residual amount of uncured material have been found to be responsible for most if not all premature release failures.

For best results, both sides of the mold surfaces should be as smooth as possible, with no scratches. They should also have a smooth edge finish. The curvature of the molds appears to be immaterial. Scratches in the molds have been found to be more important than just producing the same defect in the finished lens. During the reaction free radicals are generated and these free radicals may be sensitive to surface conditions, particularly if no mold release agent is used. Scratches on the surface may initiate cracking and aberrations. Scratches may cause more or less adhesion and premature release often appears to begin at a scratch.

Mold markings cause differential light intensity conditions under the marking, even when the mark is on the outside surface of the mold. The fully exposed region of the lens will be harder, and the sample may have stresses because of this. The portion of the lens under the mark will be weaker at the end of the curing period. This effect has been observed and can cause premature release or induce cracking.

Mold defects at the edges interfere with the sealing conditions and frequently induce premature release.

The second embodiment of the present invention will now be described in more detail with reference to the following examples. These examples are merely illustrative of the composition and method of the invention and are not intended to be limiting.

EXAMPLE 3

The objective of this Example was to produce optical lenses incorporating bisphenol A diallyl carbonate that were as hard as conventional thermally cured DEG-BAC lenses, were not brittle, had desirable color and clarity, and did not have any patterns, defects or aberrations.

The results of various representative sample formulations are indicated below. In each trial the following conditions were observed 1. All liquid materials were treated with alumina powder (basic) before use.

2. Sylvania Fluorescent (F158T/2052) lamps which generate an intensity of 5.0 to 6.6 mW/sqcm of UV light were used as a light source. UV light reaching the mold surface, however, was on the order of 1.5 mW/sqcm and the samples were irradiated for approximately 20 minutes.

3. The molds had a diameter of 75 mm.

4. Commercially available HIRI II, high flash point material, was used which included 91% by weight bisphenol A diallyl carbonate, 7% by weight DEG-BAC and 2% by weight antiyellowing additives. The UV absorber was removed prior to formulating the compositions.

Formulation 1

A plastic lens composition including a monomer mixture consisting of 21.66 parts by weight of bisphenol A diallyl carbonate, (together with 1.67 parts by weight of DEG-BAC and 0.48 parts by weight of antiyellowing additives available as HIRI II from Pittsburgh Plate Glass), 15.8 parts by weight of tetraethylene glycol diacrylate (TTEGDA available from Interez), 15.0 parts by weight of tripropylene glycol diacrylate (TRPGDA available from Interez), 19.6 parts by weight of trimethylol propanetriacrylate (TMPTA available from Interez), 22.3 parts by weight of 1,6 hexanedioldimethacrylate (HDDMA available from Rohm Tech, Inc.), 3.50 parts by weight of styrene (available from Fisher); a photosensitizer consisting of 0.05 parts by weight of 1-hydroxycyclohexyl phenyl ketone (available as Irgacure 184 from Ciba-Geigy); and a mold release agent consisting of 76 ppm of butyl stearate were placed in a reaction chamber disposed between opposed 550 and 775 glass molds configured to generate a positive correction lens. The molds were separated by a distance of 1.8 mm by a vinyl type gasket. The radiation cell was as described above with reference to FIG. 6 and the radiation lenses were negative power lenses.

The composition was irradiated for a period of 17 minutes and exhibited a smooth and slow rate of temperature increase.

The lens was an overall good product exhibiting a favorable appearance in terms of color and clarity and having a flexibility resistance that was better than conventional DEG-BAC lenses.

Formulation 2

A plastic lens composition including a monomer mixture consisting of 23.21 parts by weight of bisphenol A diallyl carbonate, (together with 1.79 parts by weight of DEG-BAC and 0.51 parts by weight of antiyellowing additives, available as HIRI II from Pittsburgh Plate Glass), 15.9 parts by weight of tetraethylene glycol diacrylate (TTEGDA available from Interez), 15.3 parts by weight of tripropylene glycol diacrylate (TRPGDA available from Interez), 16.2 parts by weight of trimethylol propanetriacrylate (TMPTA available from Interez), 23.4 parts by weight of 1,6 hexanedioldimethacrylate (HDDMA available from Rohm Tech, Inc.), 3.60 parts by weight of styrene (available from Fisher); a photosensitizer consisting of 0.051 parts by weight of 1-hydroxycyclohexyl phenyl ketone (available as Irgacure 184 from Ciba-Geigy); and a mold release agent consisting of 114 ppm of butyl stearate were placed in a reaction chamber disposed between opposed glass molds configured to generate a positive (2.7D) correction lens. The glass molds were separated by a vinyl type gasket. The glass molds were washed and treated with methylethyl ketone prior to the reaction. The radiation cell was as described above with reference to FIG. 6 and the radiation lenses were negative power lenses.

The composition was irradiated for a period of 18 minutes and exhibited a smooth reaction that was not too fast and not too slow. The lens did not crack and did not release prematurely. The lens had a flexibility resistance that was better than conventional DEG-BAC lenses. The lens, however, was brittle near its edges which is believed to be caused by slight interference with the incident light caused by the lens molding apparatus.

Formulation 3

A plastic lens composition including a monomer mixture consisting of 25.57 parts by weight of bisphenol A diallyl carbonate (together with 1.97 parts by weight of DEG-BAC and 0.56 parts by weight of antiyellowing additives, available as HIRI II from Pittsburgh Plate Glass), 14.0 parts by weight of tetraethylene glycol diacrylate (TTEGDA available from Interez), 16.8 parts by weight of tripropylene glycol diacrylate (TRPGDA available from Interez), 14.3 parts by weight of trimethylol propanetriacrylate (TMPTA available from Interez). 24.1 parts by weight of 1,6 hexanedioldimethacrylate (HDDMA available from Rohm Tech, Inc.), 2.60 parts by weight of styrene (available from Fisher); a photosensitizer consisting of 0.048 parts by weight of 1-hydroxycyclohexyl phenyl ketone (available as Irgacure 184 from Ciba-Geigy); were placed in a reaction chamber disposed between opposed 660 and 500 glass molds configured to generate a negative correction lens. The molds were separated a distance of 4.8 mm by a gasket. The radiation cell was as described above with reference to FIG. 6. The molds were sprayed with butyl stearate as a mold release agent prior to the curing process.

The composition was irradiated for a period of 20 minutes. The finished lens exhibited no haziness and good hardness but was brittle at its edges. The butyl stearate sprayed on the mold surface led to surface anomalies in the finished lens.

EXAMPLE 4

The objective of this Example was to produce optical lenses incorporating bisphenol A diallyl carbonate that were as hard as conventional thermally cured DEG-BAC lenses, were not brittle, had desirable color and clarity, and did not have any patterns, defects or aberrations.

In each trial of tis Example, Sylvania Fluorescent (F158T/2052) lamps which generate an intensity of 5.0 to 6.6 mW/sqcm of UV light were used as a light source.

The basic ingredients of the formulations according to Example 4 included TTEGDA, TRPGDA, TMPTA, bisphenol A diallyl carbonate, styrene and 1-hydroxycyclohexyl phenyl ketone.

Commercially available HIRI II, high flash point material was used which included 91% by weight bisphenol A diallyl carbonate, 7% by weight DEG-BAC and 2% by weight antiyellowing additives. The UV absorber was removed prior to formulating the compositions.

A release agent containing alcohol phosphates commercially available from DuPont under the trade name Zelec UN, was tested as a mold release agent to supplement butyl stearate. The recommended concentration of this material in a thermal curing process is in the range of 25 to 50 ppm. This was found to be much too high for a photochemical process without external pressure and any amount greater than 2 ppm Zelec UN in the formula resulted in circular striations. Examination of the defects caused by Zelec UN showed them to be weak and easily scratched. They were also attacked by acetone.

Often, the monomers were passed through beds of alumina (basic) to remove impurities. This was especially true for the monomer TRPGDA.

The results of various representative sample formulations are indicated below.

Sample formulation 4 was irradiated in a reaction cell as described above with reference to FIG. 6.

Each of sample formulations 5-7 and comparative sample formulations 8-9 was irradiated in a reaction cell as described above with reference to FIG. 7.

As shown in FIG. 7, the lens forming chamber 106 is thermally insulated on the sides by gaskets 110. According to this example, the chamber 106 was thermally insulated by two large gaskets 110 having the following dimensions: 92 mm OD, 85 mm ID and 75 mm lip diameter, and on top and bottom by two powerless glass molds 108 having a 76 mm diameter which fit into the large gaskets 110. Three sheets of tracing paper 108 were inserted between the powerless glass molds 108 and the glass molds 102 of the lens forming chamber 106.

Heat exchange between the reaction cell and its surroundings was reduced greatly with this arrangement. Even without the extra gaskets 110 (as in Formulation 4) heat loss through the reaction cell gasket 104 was slow, but without the extra gaskets 110 some defects were observed near the edge of the lens. The radiation cell technique shown in FIG. 7 yielded lenses with greatly improved edges.

Frosted glass in place of the glass molds 108 was tried and worked as well as clear glass molds 108 plus tracing paper. In any case, good sealing was very important to produce high quality lenses.

Gasket material and lip finish were also very important. Most of the trials were carried out using vinyl gaskets that had been used many times so that the quality of the lip had deteriorated making sealing difficult. The vinyl gasket, however, appeared to be the best material. Black gaskets usually lacked sufficient flexibility at conditions around the T(max) of 45° C.

Silicone gaskets usually were too flexible and caused leaking problems during the early period of radiation. A clamp was necessary at least in the early stages for silicone gaskets.

Imperfect sealing and gasket material, plus a small residual amount of uncured material were responsible for most or all premature releases.

When the reaction cell was not completely sealed, a small amount of air leaked in and prevented the polymerization of the monomer mixture that it reached resulting in some uncured residual liquid remaining at the gasket lip.

Formulation 4

A plastic lens composition including a monomer mixture consisting of 23.63 parts by weight of bisphenol A diallyl carbonate (together with 1.82 parts by weight of DEG-BAC and 0.52 parts by weight of antiyellowing additives available as HIRI II from Pittsburgh Plate Glass), 16.05 parts by weight of tetraethylene glycol diacrylate (TTEGDA available from Interez), 15.64 parts by weight of tripropylene glycol diacrylate (TRPGDA available from Interez), 16.59 parts by weight of trimethylol propanetriacrylate (TMPTA available from Interez), 23.87 parts by weight of 1,6 hexanedioldimethacrylate (HDDMA available from Rohm Tech, Inc.), 1.48 parts by weight of styrene (available from Fisher); a photosensitizer consisting of 0.02 parts by weight of 1-hydroxycyclohexyl phenyl ketone (available as Irgacure 184 from Ciba-Geigy) were placed in a reaction chamber disposed between opposed glass molds configured to generate a bifocal correction lens. The glass molds were separated by silicon gaskets to produce a lens that was 2 mm thick at the edge and 7.7 mm thick in the center. The lens composition was irradiated for a total of 36 minutes. After 20 minutes of irradiation mold release occurred at the bifocal. The ultraviolet light passing through the cell had an intensity of 1.1 mW/sqcm. Under these conditions the t(max) reached 48° C. after 16 minutes of irradiation and fell to 47° C. after 20 minutes of irradiation. After the radiation there was found some residual liquid around the gasket lip. The produced lens had excellent color, no patterns and good hardness. The edge of the lens was not perfect but the lens was still an overall acceptable product.

Formulation 5

A plastic lens composition including a monomer mixture consisting of 23.66 parts by weight of bisphenol A diallyl carbonate (together with 1.82 parts by weight of DEG-BAC and 0.52 parts by weight of antiyellowing additives available as HIRI II from Pittsburgh Plate Glass), 16.0 parts by weight of tetraethylene glycol diacrylate (TTEGDA available from Interez), 15.6 parts by weight of tripropylene glycol diacrylate (TRPGDA available from Interez), 16.6 parts by weight of trimethylol propanetriacrylate (TMPTA available from Interez), 23.9 parts by weight of 1,6 hexanedioldimethacrylate (HDDMA available from Rohm Tech, Inc.), 1.8 parts by weight of styrene (available from Fisher); and a photosensitizer consisting of 0.02 parts by weight of 1-hydroxycyclohexyl phenyl ketone (available as Irgacure 184 from Ciba-Geigy) were placed in a reaction chamber disposed between opposed 550 and 775 glass molds configured to generate a positive 3D correction lens. The glass molds were separated by a distance of 1.8 mm by vinyl gaskets. The lens composition was irradiated for 40 minutes and the finished lens showed no patterns, had good hardness, and good color and clarity.

Formulation 6

A plastic lens composition including a monomer mixture consisting of 23.66 parts by weight of bisphenol A diallyl carbonate (together with 1.82 parts by weight of DEG-BAC and 0.52 parts by weight of antiyellowing additives available as HIRI II from Pittsburgh Plate Glass), 16.0 parts by weight of tetraethylene glycol diacrylate (TTEGDA available from Interez), 15.6 parts by weight of tripropylene glycol diacrylate (TRPGDA available from Interez), 16.6 parts by weight of trimethylol propanetriacrylate (TMPTA available from Interez), 23.9 parts by weight of 1,6 hexanedioldimethacrylate (HDDMA available from Rohm Tech, Inc.), 1.8 parts by weight of styrene (available from Fisher); and a photosensitizer consisting of 0.02 parts by weight of 1-hydroxycyclohexyl phenyl ketone (available as Irgacure 184 from Ciba-Geigy) were placed in a reaction chamber disposed between opposed glass molds configured to generate a positive 5D or 6.5D correction lens. In these trials the glass molds were separated by a black gasket. The lens compositions were irradiated for 46 minutes and the finished lenses showed no patterns, had good hardness and good color and clarity.

Formulation 7

A plastic lens composition including a monomer mixture consisting of 23.66 parts by weight of bisphenol A diallyl carbonate (together with 1.82 parts by weight of DEG-BAC and 0.52 parts by weight of antiyellowing additives available as HIRI II from Pittsburgh Plate Glass), 16.0 parts by weight of tetraethylene glycol diacrylate (TTEGDA available from Interez), 15.6 parts by weight of tripropylene glycol diacrylate (TRPGDA available from Interez), 16.6 parts by weight of trimethylol propanetriacrylate (TMPTA available from Interez), 23.9 parts by weight of 1,6 hexanedioldimethacrylate (HDDMA available from Rohm Tech, Inc.), 1.8 parts by weight of styrene (available from Fisher); and a photosensitizer consisting of 0.02 parts by weight of 1-hydroxycyclohexyl phenyl ketone (available as Irgacure 184 from Ciba-Geigy) were placed in a reaction chamber disposed between opposed glass molds configured to generate negative correction lenses. The molds were configured to generate a −1 lens or a −4 lens. The lens composition was irradiated for 40 minutes. The −1 lenses were successfully completed while the −4 lenses prematurely released. The −4 lens released prematurely because the lens gasket could not be completely covered by the insulating gaskets.

Comparative Formulation 8

A plastic lens composition including a monomer mixture consisting of 23.48 parts by weight of bisphenol A diallyl carbonate (together with 1.81 parts by weight of DEG-BAC and 0.51 parts by weight of antiyellowing additives available as HIRI II from Pittsburgh Plate Glass), 16.1 parts by weight of tetraethylene glycol diacrylate (TTEGDA available from Interez), 15.5 parts by weight of tripropylene glycol diacrylate (TRPGDA available from Interez), 16.3 parts by weight of trimethylol propanetriacrylate (TMPTA available from Interez), 24.6 parts by weight of 1,6 hexanedioldiacrylate (HDDA available from Rohm Tech, Inc.), 1.6 parts by weight of styrene (available from Fisher); and a photosensitizer consisting of 0.034 parts by weight of 1-hydroxycyclohexyl phenyl ketone (available as Irgacure 184 from Ciba-Geigy) were placed in a reaction chamber disposed between opposed 550 and 775 glass molds configured to generate a positive correction lens. The molds were separated by a distance of 1.8 mm. The lens cracked around the central area. The substitution of HDDA for HDDMA was responsible for this defect.

Comparative Formulation 9

A plastic lens composition including a monomer mixture consisting of 28.94 parts by weight of bisphenol A diallyl carbonate (together with 2.23 parts by weight of DEG-BAC and 0.63 parts by weight of antiyellowing additives available as HIRI II from Pittsburgh Plate Glass), 19.2 parts by weight of tetraethylene glycol diacrylate (TTEGDA available from Interez), 24.3 parts by weight of tripropylene glycol diacrylate (TRPGDA available from Interez), 22.7 parts by weight of trimethylol propanetriacrylate (TMPTA available from Interez), 1.9 parts by weight of styrene (available from Fisher); a photosensitizer consisting of 0.0197 parts by weight of 1-hydroxycyclohexyl phenyl ketone (available as Irgacure 184 from Ciba-Geigy); and a mold release agent consisting of 1.8 ppm of Zelec UN (available from DuPont) were placed in a reaction chamber disposed between opposed glass molds configured to generate positive 1D, 3D and 5D correction lenses as well as negative 1D lenses. The produced lenses were not thoroughly cured in the center and were flexible at high temperatures. It was concluded from these trials that HDDMA is an essential component of the composition for desirable high temperature properties of the lenses.

EXAMPLE 5

The objective of this Example was to produce optical lenses, incorporating bisphenol A diallyl carbonate that were as hard as conventional thermally cured DEG-BAC lenses, were not brittle, had desirable color and clarity, and did not have any patterns, defects or aberrations.

In each trial of this Example commercially available HIRI II was used. Prior to formulation, however, the UV absorber and the DEG-BAC components were removed. The composition thus included 98% by weight bisphenol A diallyl carbonate and 2% by weight antiyellowing additives. Lenses made from this composition showed no significant differences from lenses made with HIRI II in which the UV absorber, the DEG-BAC and the antiyellowing additive components were removed. It was determined that any yellowing problems in lenses made from HIRI II in which the UV absorber, the DEG-BAC and the antiyellowing additives were removed could be counteracted and overcome by including a very small amount on the order of one drop or from about 0.2 to 0.4 ppm of styrene containing a blue dye including 9.10-anthracenedione, 1-hydroxy-4-[(4-methylphenyl) amino](available as Thermoplast Blue 684 from BASF Wyandotte Corp.)

In each trial of this Example, Sylvania Fluorescent (F158T/2052) lamps which generate an intensity of 5.0 to 6.6 mW/sqcm of UV light were used as a light source.

Formulation 10A

A plastic lens composition including a monomer mixture consisting of 24.01 parts by weight of bisphenol A diallyl carbonate (together with 0.49 parts by weight of antiyellowing additives available as HIRI II from Pittsburgh Plate and Glass), 16.2 parts by weight of tetraethylene glycol diacrylate (TTEGDA available from Interez), 16.7 parts by weight of tripropylene glycol diacrylate (TRPGDA available from Interez), 16.7 parts by weight of trimethylol propanetriacrylate (TMPTA available from Interez), 22.7 parts by weight of 1,6 hexanedioldimethacrylate (HDDMA available from Rohm Tech), 3.0 parts by weight of styrene (available from Fisher); a photosensitizer consisting of 0.023 parts by weight of 1-hydroxycyclohexyl phenyl ketone (available as Irgacure 184 from Ciba-Geigy); and a mold release agent consisting of 0.7 ppm of Zelec UN (Available from DuPont) were placed in a reaction chamber disposed between opposed 660 and 520 glass molds configured to generate a negative correction lens. The molds were separated a distance of 4.8 mm by a gasket. The lens composition was irradiated for approximately 20 minutes.

The intensity of ultraviolet light entering the mold was 2.2 mW/sqcm from above and 2.5 mW/sqcm from below.

Frosted glass was used in place of the insulating powerless glass molds.

The finished lens had good color and clarity, no patterns and good hardness without brittleness.

Formulation 10B

A plastic lens composition including a monomer mixture consisting of 24.01 parts by weight of bisphenol A diallyl carbonate (together with 0.49 parts by weight of antiyellowing additives available as HIRI II from Pittsburgh Plate Glass), 16.2 parts by weight of tetraethylene glycol diacrylate (TTEGDA available from Interez), 16.7 parts by weight of tripropylene glycol diacrylate (TRPGDA available from Interez), 16.7 parts by weight of trimethylol propanetriacrylate (TMPTA available from Interez), 22.7 parts by weight of 1,6 hexanedioldimethacrylate (HDDMA available from Rohm Tech), 3.0 parts by weight of styrene (available from Fisher); a photosensitizer consisting of 0.023 parts by weight of 1-hydroxycyclohexyl phenyl ketone (available as Irgacure 184 from Ciba-Geigy); and a mold release agent consisting of 0.7 ppm of Zelec UN (available from DuPont) were placed in a reaction chamber disposed between opposed 550 and 775 glass molds configured to generate a positive correction lens. The molds were separated a distance of 1.8 mm by a gasket. The lens composition was irradiated for approximately 20 minutes.

The intensity of ultraviolet light entering the mold was 2.2 mW/sqcm from above and 2.5 mW/sqcm from below.

Instead of frosted glass, clear radiation lenses were used and tracing paper was used over the lamps with 2 sheets at top and 1 sheet at bottom.

The finished lens had more favorable characteristics than the lens of Formulation 10A.

Formulation 11

A plastic lens composition including a monomer mixture consisting of 25.09 parts by weight of bisphenol A diallyl carbonate (together with 0.51 parts by weight of antiyellowing additives available as HIRI II from Pittsburgh Plate Glass), 15.1 parts by weight of tetraethylene glycol diacrylate (TTEGDA available from Interez), 16.1 parts by weight of tripropylene glycol diacrylate (TRPGDA available from Interez), 16.5 parts by weight of trimethylol propanetriacrylate (TMPTA available from Interez), 24.1 parts by weight of 1,6 hexanedioldimethacrylate (HDDMA available from Rohm Tech), 2.5 parts by weight of styrene (available from Fisher); a photosensitizer consisting of 0.0195 parts by weight of 1-hydroxycyclohexyl phenyl ketone (available as Irgacure 184 from Ciba-Geigy); and a mold release agent consisting of 1.0 ppm of Zelec UN (available from DuPont) were placed in a reaction chamber disposed between opposed 550 and 775 glass molds configured to generate a positive correction lens. The molds were separated a distance of 1.8 mm by a gasket. Two sheets of tracing paper were inserted between the powerless glass mold and the lens forming mold on both sides of the reaction cell. The lens composition was irradiated for approximately 23 minutes.

The finished lens showed favorable characteristics.

Formulation 12

A plastic lens composition including a monomer mixture consisting of 24.60 parts by weight of bisphenol A diallyl carbonate (together with 0.50 parts by weight of antiyellowing additives available as HIRI II from Pittsburgh Plate Glass), 15.5 parts by weight of tetraethylene glycol diacrylate (TTEGDA available from Interez), 16.3 parts by weight of tripropylene glycol diacrylate (TRPGDA available from Interez), 16.7 parts by weight of trimethylol propanetriacrylate (TMPTA available from Interez), 23.6 parts by weight of 1,6 hexanedioldimethacrylate (HDDMA available from Rohm Tech), 2.7 parts by weight of styrene (available from Fisher); a photosensitizer consisting of 0.021 parts by weight of 1-hydroxycyclohexyl phenyl ketone (available as Irgacure 184 from Ciba-Geigy); a mold release agent consisting of 0.88 ppm of Zelec UN (available from DuPont); and one drop of styrene containing a blue dye including 9,10-anthracenedione, 1-hydroxy-4-[(4-methylphenyl) amino](available as Thermoplast Blue 684 from BASF Wyandotte Corp.) were placed in a reaction chamber disposed between opposed 550 and 775 glass molds configured to generate a positive 2D correction lens. The molds were separated a distance of 1.8 mm by a gasket. The lens composition was irradiated for approximately 36 minutes.

The intensity of ultraviolet light entering the mold was 1.5 mW/sqcm from above and 2.4 mW/sqcm from below.

The finished lens showed good color, was free of distortion and was more rigid than conventional thermally cured DEG-BAC lenses. The lens also passed the safety drop-ball test after it had been in boiling water for 10 minutes.

Formulation 13

A plastic lens composition including a monomer mixture consisting of 25.30 parts by weight of bisphenol A diallyl carbonate (together with 0.52 parts by weight of antiyellowing additives available as HIRI II from Pittsburgh Plate Glass), 15.06 parts by weight of tetraethylene glycol diacrylate (TTEGDA available from Interez), 16.05 parts by weight of tripropylene glycol diacrylate (TRPGDA available from Sartomer), 16.30 parts by weight of trimethylol propanetriacrylate (TMPTA available from Interez), 24.00 parts by weight of 1,6 hexanedioldimethacrylate (HDDMA available from Sartomer), 2.76 parts by weight of styrene (available from Fisher); a photosensitizer consisting of 0.025 parts by weight of 1-hydroxycyclohexyl phenyl ketone (available as Irgacure 184 from Ciba-Geigy); and a mold release agent consisting of 0.3 ppm of dioctylphthalate (available from Aldrich) were placed in a reaction chamber disposed between opposed 415 and 775 glass molds configured to generate a positive 4D correction lens. The molds were separated a distance of 1.8 mm by a gasket. The lens composition was irradiated for approximately 25 minutes.

The finished lens showed favorable characteristics.

Comparative Formulation 14

A plastic lens composition including a monomer mixture consisting of 26.17 parts by weight of bisphenol A diallyl carbonate (together with 0.53 parts by weight of antiyellowing additives available as HIRI II from Pittsburgh Plate Glass), 15.5 parts by weight of tetraethylene glycol diacrylate (TTEGDA available from Interez), 16.0 parts by weight of tripropylene glycol diacrylate (TRPGDA available from Interez), 16.4 parts by weight of trimethylol propanetriacrylate (TMPTA available from Interez), 22.4 parts by weight of 1,6 hexanedioldimethacrylate (HDDMA available from Rohm Tech), 3.0 parts by weight of styrene (available from Fisher); a photosensitizer consisting of 0.0204 parts by weight of 1-hydroxycyclohexyl phenyl ketone (available as Irgacure 184 from Ciba-Geigy); and a mold release agent consisting of 2.5 ppm of Zelec UN (available from Du Pont) were placed in a reaction chamber disposed between opposed 550 and 775 glass molds configured to generate a positive correction lens. The molds were separated a distance of 1.8 mm by a gasket. The lens composition was irradiated for approximately 22 minutes.

The intensity of ultraviolet light at the surface of the light source was 4.8 mW/sqcm. The intensity of ultraviolet light entering the mold was 3.6 mW/sqcm. The intensity of ultraviolet light exiting the mold was 1.5 mW/sqcm.

The finished lens showed a negligible degree of patterns and had good color. The patterns that were developed in this lens were caused by too high a proportion of Zelec UN.

Comparative Formulation 15

A plastic lens composition including a monomer mixture consisting of 25.97 parts by weight of bisphenol A diallyl carbonate (together with 0.53 parts by weight of antiyellowing additives available as HIRI II from Pittsburgh Plate Glass), 16.2 parts by weight of tetraethylene glycol diacrylate (TTEGDA available from Interez), 16.8 parts by weight of tripropylene glycol diacrylate (TRPGDA available from Interez), 17.1 parts by weight of trimethylol propanetriacrylate (TMPTA available from Interez), 23.3 parts by weight of 1,6 hexanedioldimethacrylate (HDDMA available from Rohm Tech), a photosensitizer consisting of 0.0277 parts by weight of 1-hydroxycyclohexyl phenyl ketone (available as Irgacure 184 from Ciba-Geigy); and a mold release agent consisting of 1.3 ppm of Zelec UN (available from Du Pont) were placed in a reaction chamber disposed between opposed 550 and 775 glass molds configured to generate a positive correction lens. The glass molds were separated a distance of 1.8 mm by a gasket. The lens composition was irradiated for approximately 16 minutes. The lens had a slightly frosty appearance and was slightly yellow.

This trial demonstrates that it is necessary to include styrene in the formulation to prevent the lens from having a frosty appearance.

The yellow appearance was caused by a rapid temperature rise during the curing process.

Therefore, it can be seen that the present invention not only provides a method and apparatus for making plastic lenses, but provides a lens forming composition.

It is thus seen that the composition and process of the present invention provides several advantages. For example, according to certain embodiments of the present invention, the light sources utilized to cure the lens forming composition are safer, easier to use and consume less energy than conventional high pressure mercury arc lamps. Moreover, according to certain embodiments of the present invention a plastic optical lens can be cured in less than 30 minutes. Furthermore, in certain embodiments of the present invention, the lens composition includes monomers having a higher refractive index than conventional monomer materials allowing the production of thinner lenses.

Although not specifically illustrated in the drawings, it is understood that other additional and necessary equipment and structural components will be provided, and that these and all of the components described above are arranged and supported in an appropriate fashion to form a complete and operative system.

It is also understood that variations may be made in the present invention without departing from the spirit and scope of the invention. Of course, other variations can be made by those skilled in the art without departing from the invention as defined by the appended claims.

What is claimed is:

1. A plastic lens composition comprising:
   (a) from about 22.0 to about 29.0 percent by weight of bisphenol A diallyl carbonate;
   (b) from about 13.0 to about 25.0 percent by weight of 1.6 hexanedioldimethacrylate;
   (c) from about 15.0 to about 19.0 percent by weight of trimethylol propane triacrylate;
   (d) from about 12.0 to about 18.0 percent by weight of tetraethylene glycol diacrylate;
   (e) from about 12.0 to about 19.0 percent by weight of tripropylene glycol diacrylate;
   (f) from about 2.0 to about 3.0 percent by weight of styrene;
   (g) from about 0.02 to about 0.03 percent by weight of 1-hydroxycyclohexyl phenyl ketone; and
   (h) an effective amount of a mold release agent.

2. A plastic lens composition according to claim 1, comprising:
   (a) 26.0 percent by weight of bisphenol A diallyl carbonate;
   (b) 25.0 percent by weight of 1,6 hexanedioldimethacrylate;
   (c) 16.0 percent by weight of trimethylol propane triacrylate;
   (d) 15.0 percent by weight of tetraethylene glycol diacrylate;
   (e) 16.0 percent by weight of tripropylene glycol diacrylate;
   (f) 2.0 percent by weight of styrene;
   (g) 0.03 percent by weight of 1-hydroxycyclohexyl phenyl ketone; and
   (h) an effective amount of a mold release agent.

3. A plastic lens composition according to claim 1, further comprising from about 0.2 to about 0.4 ppm of 9,10-anthracenedione, 1-hydroxy-4-[(4-methylphenyl) amino].

* * * * *